United States Patent [19]

Jones

[11] 4,221,124
[45] Sep. 9, 1980

[54] BLADDER LEAK AND RUPTURE DETECTOR

[75] Inventor: Thomas C. Jones, Salem, Ohio
[73] Assignee: NRM Corporation, Akron, Ohio
[21] Appl. No.: 928,402
[22] Filed: Jul. 27, 1978
[51] Int. Cl.³ ............................................. G01M 3/26
[52] U.S. Cl. ............................................ 73/40; 425/33
[58] Field of Search ...................... 73/40, 49.2; 425/33

[56] References Cited
U.S. PATENT DOCUMENTS 4,120,193  10/1978  Tomsic et al. ............................ 73/40

Primary Examiner—Gerald Goldberg
Assistant Examiner—Joseph W. Roskos
Attorney, Agent, or Firm—Maky, Renner, Otto & Boisselle

[57] ABSTRACT

A bladder leak and rupture detector employs a low level flow sensor for detecting both bladder leaks and ruptures. False failure signals are avoided by a dual mode logic circuit which monitors for bladder leaks or low level failures only during a preselected portion of the curing cycle and at other times requires sustained flow through the sensor for a predetermined time to indicate bladder ruptures or high level failures. In either case, a warning signal is generated and the cycle may be interrupted to prevent loadng of a next tire into the curing press. Leakage flow passages may be provided for both upper and lower portions of the tire mold cavity to ensure detection of leaks, and vent passages with shut-off valves are provided to facilitate low level leak detection.

27 Claims, 3 Drawing Figures

U.S. Patent
Sep. 9, 1980
4,221,124
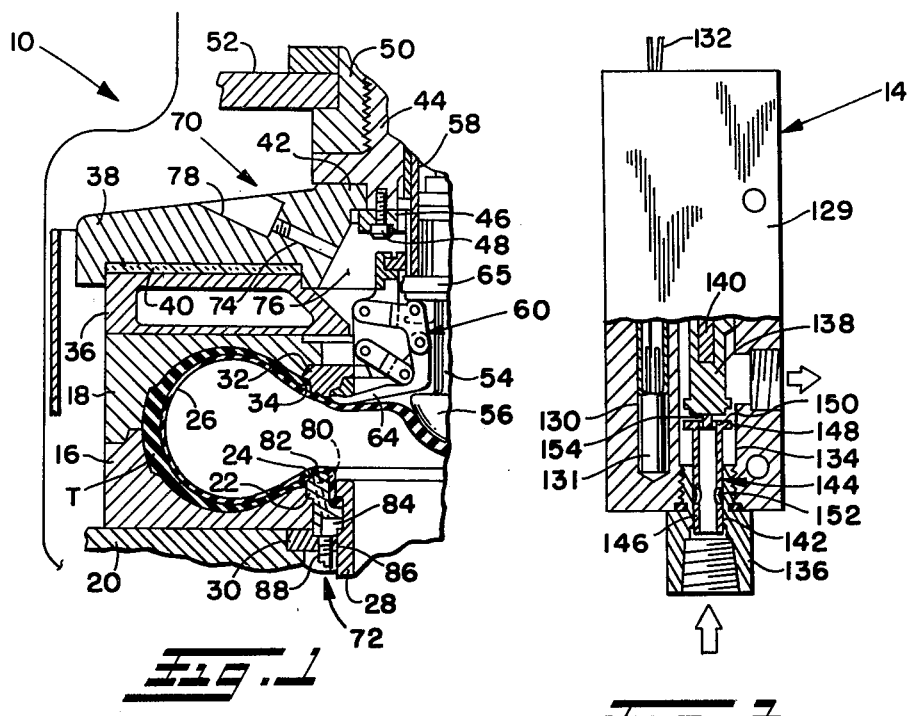
FIG. 1
FIG. 3
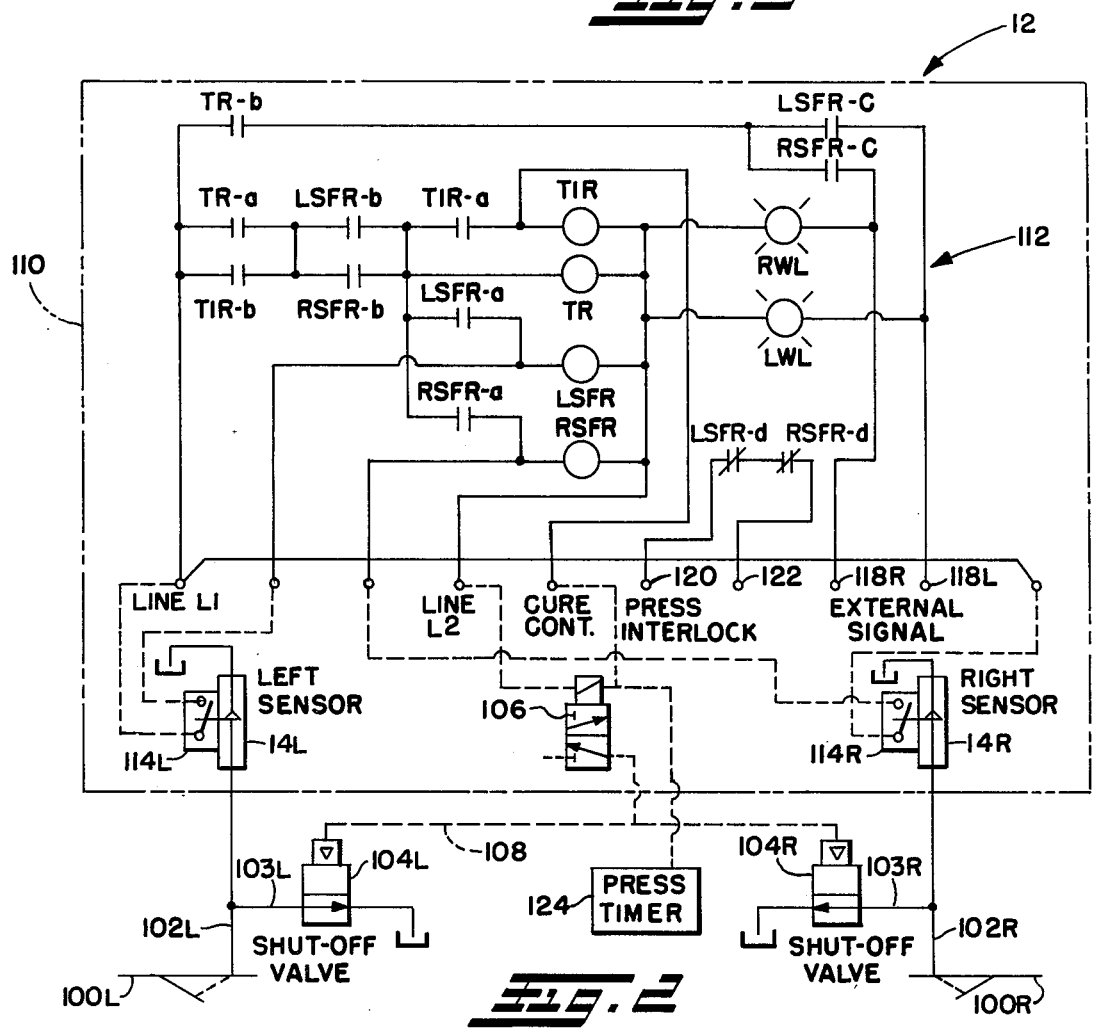
FIG. 2

BLADDER LEAK AND RUPTURE DETECTOR

BACKGROUND OF THE INVENTION

This invention relates generally to improvements in automatic, bladder-type, tire shaping and curing presses and peripheral equipment therefor, and more particularly to a bladder leak and rupture detector utilized in such presses for detecting the presence of bladder failures.

In the conventional practice of shaping and curing tires in tire curing presses, an uncured tire carcass is placed between a heated stationary lower mold section, a heated movable upper mold section, and a heated, fluid inflatable, shaping bladder which is disposed within the tire carcass. With the tire carcass in position, the press automatically and concurrently lowers the upper mold section and introduces cure media under pressure into the bladder to shape the tire carcass firmly against the mold sections, thereby both shaping and vulcanizing the tire. The tire carcass is retained in the heated mold section for the requisite time period necessary to achieve vulcanization and, upon completion of the vulcanization period, the fluid pressure is reduced and cure media removed during "blow-down" from the bladder interior, the bladder then is stripped from the cured tire and the upper mold section is raised to allow removal of the tire.

Operating in conjunction with presses of the foregoing type, tire loaders, unloaders, post-cure inflators and conveyors are employed automatically to transport the tire carcasses to the presses, locate the carcasses on the presses, remove the cured tires after cycling of the presses, post-cure inflate the tires and transport the tires to an inspection station. Thus, from the time the green tires are placed at the point where they are picked up for subsequent curing in the press, until the shaped and vulcanized tires are inspected at the inspection station, the processing of the tires is almost completely automatic. Should a malfunction occur which allows defective tires to be produced, a number of imperfect tires may be turned out by the curing press before the defect can be discovered and traced back to the press which is responsible.

One of the major malfunctions in curing presses to which "cure defects" are attributable is a ruptured or leaking bladder. The defects associated with such bladder failures result often in one of two ways. Because of leakage of the cure media through the bladder, the press is unable to develop sufficient pressure within the bladder to properly shape the tire. Alternatively, the deflect in the bladder allows the cure media to penetrate the ply fabric of the tire, which, in turn, usually results in a scrap tire because of ply separation within the tire.

Rupture of the bladder normally results when the bladder is worn out. Such rupture is usually visually perceptible by the operator who would then shut down the machine and replace the bladder. The tire in the press at the time of rupture would necessarily be defective and scrapped. Although the operator would normally visually perceive the rupture, it is desirable nonetheless to provide a detector to prevent automatically loading of new tires in the event of the bladder rupture. Moreover, it is desirable automatically to shut off the curing fluid to the press in the event of the bladder rupture.

The more difficult malfunction to detect is the leaky bladder where leakage is at a rate significantly less than the massive leaks that occur when the bladder ruptures. Often such lesser leaks prelude the rupture of the bladder and quick detection could reduce the occurrence of bladder ruptures. In normal operation, such lesser leaks are not always promptly noted or detected by even careful press operators. Should a malfunction of this type occur, a large number of defective tires may be cured prior to detection of the same.

In known detection systems of the type which monitor for such leaks and ruptures of the bladder, several basic problem areas exist. Conventional detection systems oftentimes employ static pressure responsive switches which utilize rubber diaphragms. During use, the rubber diaphragms age and harden resulting in a change in the pressure level actuating the switch. Accordingly, such type of switches have relatively poor repeatability and when hardened sufficiently, are subject to failure. Moreover, in such systems, the pressure switch settings are very critical and unstable. Many false failure signals may result from a low setting and the system arrangement of the pressure switches, particularly during shaping. Often, the press operator is faced with either setting the pressure switches at low setting to ensure detection of leaks at the cost of increased false failure signals. Alternatively, the operator could employ a high setting; however, such may result in some leaks going undetected leading to defective tires.

Another problem area in known detection systems is that only one portion of the mold cavity is monitored for leaks. Accordingly, a small leak may exist within the unmonitored portion of the mold cavity which is of insufficient pressure to migrate to the detection device. Accordingly, the bladder defect may go undetected.

SUMMARY OF THE INVENTION

The present invention provides a bladder leak and rupture detector and detector system for a tire curing press having high sensitivity, repeatability and stability. The detector provides for continuous monitoring for ruptures or high level failures and for bladder leaks or low level failures only during a preselected portion of the tire press curing cycle. In the event of a rupture or leak, a failure signal is generated and uncured tires awaiting cure may be prevented from entering the mold until the defect is corrected. Moreover, provision may be had for interrupting admission of cure media into the mold cavity in the event of a bladder rupture.

The detector is characterized by a highly sensitive sensor responsive to low levels of leakage in the press mold cavity caused by bladder leaks and a dual mode logic circuit having a programming feature to reduce false generation of bladder failure signals otherwise encountered at such low sensor actuation levels. In the first mode of operation for detection of ruptures or leakage failures of the bladder, the sensor is required to be continuously actuated for a predetermined time before a failure signal is generated. Accordingly, false failure signals otherwise generated in response to actuation of the sensor of less duration than the predetermined time, which may be caused, for example, by manipulation of the bladder during shaping, are inhibited. Only in the event of sustained sensor actuation, as in the case of bladder rupture or a leak, will the detector generate a failure signal and interrupt the operation of the press. In the second or leak test mode, actuation of the sensor in response to low levels of leakage result in an immediate failure signal being generated by the detector. Leaks are detected instantaneously only during a preselected portion of the curing cycle and preferably during blow-down. During the low level test mode, the sustained flow feature is not required. To faciitate the low level leak detection vent passages and shut-off valves are provided.

The sensor utilized in the preferred embodiment of the invention is of high sensitivity, repeatability and durability and monitors for bladder failures from a flow principle in contrast to sensors conventionally employed that are pressure or temperature responsive. The sensor comprises a housing having a vertical bore in which is movably disposed a magnet carrying shuttle. A metering piston is employed to move the shuttle in response to flow through the sensor which through magnetic force actuates an electrical switch mounted adjacent the bore in the housing.

It is therefore a principal object of the present invention to provide a highly sensitive bladder leak detector.

Another principal object is to provide such leak detector which is flow responsive.

Still another important object is to provide such detector with two programmed modes of operation, one requiring sustained flow to create the signal and the other not.

Still another object is to provide such a detector which has high sensitivity, repeatability and stability.

Yet another object is to provide a substantially self-contained detector for facilitating installation of the detector in new presses and retrofitting of existing tire presses.

A further object of the present invention is to provide a bladder failure detection system which monitors for low level bladder leaks in both the upper and lower portions of the tire mold cavity.

Other objects and advantages of the present invention will become apparent as the following description proceeds.

To the accomplishment of the foregoing and related ends the invention, then, comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

BRIEF DESCRIPTION OF THE DRAWING

In the annexed drawing:

FIG. 1 is a fragmented, sectional view of a tire curing press modified in accordance with the present invention;

FIG. 2 is a schematic illustration of the bladder leak and rupture detector and detector system of the present invention; and FIG. 3 is an elevation view, partially section, showing a preferred form of sensor employed in the detector of the invention.

DESCRIPTION OF THE PREFERRED EMBODIMENTS

Referring now in greater detail to the drawing, FIG. 1 shows a portion of a bladder-well type curing press indicated generally by reference numeral 10 having provision for monitoring for leaks in both the upper and lower portions of the tire press mold cavity; FIG. 2 illustrates schematically a preferred form of leak and rupture detector generally indicated by reference numeral 12, and system therefor, which is responsive to leakage flow from the mold cavity of the press 10 through a sensor whereby a failure signal is generated and the press operation may be interrupted if a bladder failure is indicated; and FIG. 3 shows a preferred form of sensor for the detector 12 of the invention and is generally indicated by reference numeral 14.

The Tire Press

Referring now particularly to FIG. 1, the tire curing press 10 comprises a tire mold for shaping and curing a tire carcass T including separable mold sections 16 and 18. In the event the curing press is of the commomly used dual cavity type, there are two such tire molds formed in side-by-side relationship. The lower mold section 16 is normally stationary on a base (not shown) of the press, and the upper mold section 18 is supported above the lower mold section for movement toward and away from the latter under the action of a suitable and conventional drive assembly (not shown).

As shown, the bottom mold section 16 is supported on a steam platen 20 and is provided with a lower toe ring 22 which has an upwardly facing, annular arcuate shoulder 24 defining a seat for the lower bead of the tire T. A shaping bladder 26 is shown received in the interior cavity of the tire T and is clamped to the interior of the toe ring 22 at its annular edge by an annular flange of a cylindrical well 28. The well 28 is mounted for limited vertical movement through clamping ring 30 to facilitate the clamping and unclamping of the edge of the bladder so that the latter may be quickly changed when required. It will be appreciated that when the press is opened, the bladder will be invaginated into well 28.

The upper mold section 18 is provided with an upper toe ring 32 which has a downwardly facing, annular, arcuate shoulder 34 defining the seat for the upper bead of the tire T. Situated above the upper mold section is steam platen 36 which in turn is secured to bolster plate 38 with a layer of insulation 40 being provided therebetween. The bolster plate includes an inwardly directed annular flange 42 which fits within a downwardly projecting shoulder of a large annular adjusting screw 44. The flange is retained within such shoulder by ring 46 secured to the bottom of the screw 44 by suitable fasteners 48. The screw 44 is in threaded engagement with large nut 50 which is in turn secured to the fabricated head 52 of the press which is commonly mounted for vertical, and then horizontal movement, to open the press, and in the inverse direction to close the press. It will be seen that rotational adjustment of the screw 44 within the nut 50 may be employed vertically to adjust the position of the top mold section so that the press may accommodate molds of different sizes.

Mounted concentric with the upper mold section 18 is a bladder ram 54 having a hemispherical nose 56. The bladder ram 54 is confined for vertical movement within tire stripping tube 58 for extension and retraction of the nose 56 into and out of the bladder well 28 in the manner described below.

Surrounding the bladder ram 54 is an expandable tire chuck assembly 60 which includes linkages to which are connected for swinging movement a plurality of chuck sector plates 64. The sector plates 64 are provided with circular outer edges which nest in recesses in the upper toe ring 32 in their fully retracted position. The heels of the sector plates 64 fit closely within the outwardly extending shoulder provided by the nose of the ram when the latter is retracted. Expansion of the chuck assembly is effected by actuation of the bladder ram, the shoulder 65 of which cams the linkages downwardly thus causing the sector plates 64 to swing outwardly.

In conventional operation of the press, the upper mold section 18 may be in its open offset position. A green tire carcass is placed on a loader platform in front of the press. A loader, not shown, elevates the green tire and places it on the lower toe ring 22. While still held by the loader chuck, the bladder may then be inflated into the tire. When the bladder grips the tire, the loader releases the tire and ascends out of the way. The press head then moves laterally and then vertically downwardly and may seat the green tire in registry with the upper toe ring 32 of the top mold section 18. The press continues to lose as pressure is applied to the interior of the bladder. At this time, the press may go through several shaping pauses wherein the press stops and the pressure within the bladder changes. The shaping pauses and manipulation of the bladder ensure that no air is trapped between the bladder and the interior of the tire. The escape of trapped air may during this period of the cycle create false signals in conventional bladder leak detectors.

The pressure within the bladder 26 is increased and the press continues its closing operation with the press head 52 and top mold section 18 descending to shape the tire. The press then fully closes as seen in FIG. 1 and remains in such position during the curing cycle. During the cure cycle, cure media is circulated through the bladder 26.

After a press timer normally employed in automatic presses indicates the completion of the curing cycle, the pressure within the bladder is reduced by discharging the pressurized cure media through discharge vents provided in the wall 28. Such is commonly termed the blow-down portion of the press cycle. At the completion of blow-down, the stripping ram 54 extends downwardly and simultaneously the sector plates 64 extend radially outwardly to underly the upper bead of the tire. With the ram extended fully downwardly to invaginate the bladder back into the well, the press begins to open carrying with it the cured tire to clear the press for loading of the next tire. The cycle is then repeated for the next green tire carcass unless interrupted by a failure signal generated in the below described manner.

In the event of failure of the bladder during pressurization of the same, cure media will leak into that portion of the mold cavity between the bladder 26 and the mold sections 16 and 18. In accordance with the invention, such leakage may be channeled through upper and lower leakage passages 70 and 72, respectively, via suitable piping to the sensors 14 to be subsequently described for detection of the bladder leak by the detector 12.

The Upper and Lower Leakage Passages

The upper leakage passage 70 comprises a diagonal bore 74 in the bolster plate 38 communicating with chamber 76 which generally houses the ram and chuck assembly. It should be appreciated that the chamber 76 communicates with that portion of the mold cavity between the bladder and upper mold section. Preferably the chamber 76 is suitably sealed to provide a substantially fluid-tight chamber but for the passage 70 the purpose of which will become more apparent below. The outer end of the bore 74 opens to an enlarged recess 78 and is threaded for connection to the threaded end of a fitting of a line which may be connected at its other end to the detector 12 in the below described manner.

The lower leakage passage 72 comprises a plurality of diagonal bores 80 provided in the lower toe ring 22 which open to and extend axially diagonally inwardly from the arcuate shoulder 24 of the toe ring 22. The bores 80 at the upper end may be interconnected by a shallow annular channel in the toe ring indicated at 82 and the lower end opens to an annular chamber 84 defined by the toe ring 24, well 28 and clamping ring 30. An opening 86 is provided in the clamping ring 30 to which a line 88 may be connected for connection of the lower vent to the detector 12 in the below described manner.

Although only the lower leakage passages need be provided, since most bladder failures occur in the area of the lower bead, preferably both are provided to ensure detection of the smaller leaks in other areas which may go undetected. When the bladder 26 has a small hole or tear therein, a small amount of steam and moisture condensation will leak through the bladder at the leak and contact the inner surface of the tire. When the pressure in the bladder is reduced at the end of the pressure cycle during blow-down, the moisture trapped between the bladder and tire will expand or flash. Such leakage will pass between the bladder and tire into either of the leakage passages 70 or 72 where it then flows to the detector 12 for actuation of the same and subsequent indication of a bladder failure.

The Detector Generally

Referring now to FIG. 2, the preferred form of blader leak and rupture detector 12 and system therefor in accordance with the invention is schematically illustrated, and is responsive to leakage flow through a tire curing press leakage passage such as described above as will occur when there is a bladder leak or rupture. Because most tire curing presses manufactured or in use today are of the dual cavity type, the detector will be described for such type of presses, it being understood that the principles of the invention may be adapted to curing presses of other types. Accordingly, there is schematically illustrated the left and right mold cavities 100L and 100R, respectively, of a dual cavity press, and respective leakage lines 102L and 102R are provided therefore which are connected to the respective leakage passages of the mold cavities. In the event both mold cavities are provided with upper and lower leakage passages as illustrated in the preferred tire curing press of FIG. 1, two detectors may be provided, one for the upper leakage passages and one for the lower leakage passages of the tire mold cavities. It will also be appreciated that the disclosed detector 12 may be easily modified to monitor any number of leakage passages for fluid flow therethrough as will become apparent below.

For each line 102L and 102R, respective vent lines 103L and 103R are provided and respectively have normally open shut-off valves 104L and 104R for connecting the respective mold cavities to the atmosphere. When the valves are closed the mold cavities are preferably substantially fluid-tight. Alternatively, the vent lines 103L and 103R may be directly connected to their respective mold cavities for venting the same.

If the mold cavities were not vented, corresponding pressurization of the trapped air between the mold sections and the bladder would inhibit the bladder's manipulation and pressurization. Moreover, there would be an increased incidence of false failure signals if all flow from the cavity were directed through the sensors for reasons that will become more apparent.

The shut-off valves 104L and 104R are controlled by a solenoid operated pilot valve 106 which when energized connects the shut-off pilot valves via line 108 to a source of pressurized fluid for closing the valves. When closed, any flow through the vent lines 102L and 102R is directed through left and right pressure or flow sensors 14L and 14R, respectively, for the left and right mold cavities 100L and 100R. It will be appreciated that any suitable sensors responsive to low leakage levels, as occur with small bladder leaks, may be utilized according to the invention in its broadest sense; however, the sensors are preferably of the highly sensitive, low flow type shown in FIG. 3 and described below. For purposes of the below discussion, the sensors will be considered to be those of such type described.

The shut-off valves 104L and 104R may be conveniently located and mounted on the press. However, the left and right sensors 14L and 14R are preferably housed on a panel 110 along with the logic circuit of the present invention generally indicated by reference mumeral 112 to facilitate the addition of the detector to existing tire curing presses. Of course, the detector system can readily be incorporated if desired into the master control panel commonly provided for such presses.

The Logic Circuit

Referring now more particularly to the logic circuit 112, control voltage is applied to the logic circuit at voltage leads L1 and L2 which may, for example, comprise a 120 volt AC power circuit. Also, suitable piping and fittings may be provided for connecting the sensors 14L and 14R to the lines 102L and 102R, respectively, and the solenoid pilot valve 106 to the shut-off valves.

As previously indicated, the logic circuit 112 of the invention provides for two failure detection modes for each mold cavity, i.e., a sustained level detection mode and an instantaneous or ensured level detection mode, while employing a single sensor. For convenience of description, the portion of the circuit associated with failure detection in one of the cavities, e.g. the left mode cavity 100L, will initially be described. It will be appreciated that the following description is equally applicable for the portion of the circuit associated with the right mold cavity 100R.

In the system failure or sustained level mode, the shut-off valve 104L is deenergized and thus remains open venting the tire mold cavity 100L to the atmosphere. It will be appreciated that when the shut-off valve is so open, a substantially leakage flow or pressure is required to activate the sensor 14L as the major portion of the fluid is directed to the atmosphere via the vent line 103L. This permits a highly sensitive sensor to be used which may be set a low actuation level sufficient to detect small leaks as subsequently described. With the shut-off valve 104L open, flow and pressure changes associated with manipulation of the bladder 26 would be insufficient normally to activate the sensor 14L.

In the event of a leak resulting in substantial flow of fluid through the left line 102L and also through the left sensor 14L, the normally open left sensor switch 114L closes to actuate, and to latch, the left system failure relay LSFR. On being latched, relay contacts LSFR-a are closed thereby energizing the timer relay TR which is set to latch only after a predetermined time interval of substantially continuous uninterrupted energization. An interval of 10 seconds has been found to be satisfactory. In the event that the timer relay TR is energized for such sufficient time, timer relay contacrs TR-a are closed, and along with series connected relay contacts LSFR-b which closed when the left system failure relay LSFR latched, complete a holding circuit connecting the left system failure relay LSFR and timer relay TR with line L1 thereby to maintain the same continuously energized and their respective contacts closed. However, if the flow causing the switch 114L to close has disappeared within the timed inteval, nothing will happen since the various LSFR switches have reopened or reclosed as the case may be.

The left system failure relay LSFR has additional relay contacts LSFR-c in series with additional timer relay contacts TR-b which are operable when closed to energize a left warning light LWL. Accordingly, the left warning light LWL will only signal a bladder failure when the left sensor 14L has been substantially continuously actuated by leakage flow in the line 102L. In addition to the left warning light, an external warning signal may be provided by connection to terminal 118L for providing an audio warning signal, additional warning lights, curing media cut-off or the like.

Moreover, a fourth set of left system failure relay contacts LSFR-d are provided and normally are closed. Such contacts may be suitably connected in line at terminals 120 and 122 with the press interlock commonly provided in tire curing presses. In the event of some malfunction in the press, the interlock is operable to inactivate for loading a next uncured tire into the mold. In the system shown, the relay contacts LSFR-d are normally closed allowing normal operation of the press. Upon energization and latching of the left system failure relay LSFR, the contacts LSFR-d will open and activate the press interlock thus preventing loading of a next tire into the press as long as the contacts remain open.

As mentioned above, a holding circuit is established upon closing of the timer relay contacts TR-a which maintain the timer relay TR and left system failure relay LSFR energized. Accordingly, a failure signal will be continuously generated thereafter until the logic circuit is reset by an operator. Normally, such a sustained level indication will be a signal that the bladder has ruptured.

The second mode or low level instantaneous leak detection mode is operable only during a preselected portion of the cure cycle, such as during blow-down when the bladder is not being manipulated and any moisture having leaked through the bladder between the same and the mold sections will flash as the pressure is reduced resulting in pressure or fluid flow in the leakage passage, through the line 102L to the sensor 14L for actuation of the same. To initiate the leak detection mode, the press timer 124 can be set to generate a signal during blow-down. For example, the signal can be generated at or somewhat before the beginning of blow-down and be maintained for a period of time such as 30 seconds. The signal energizes and causes to latch the timer inhibitor relay TIR. On being latched, the timer inhibitor relay contacts TIR-a are closed thereby energizing the timer relay during the entire leak test period. After the timer relay TR has been energized continuously for the predetermined time, the timer relay TR will latch closing contacts TR-a and TR-b as described above. It will be appreciated that the timer inhibitor relay TIR inhibits the delay feature of the high level or sustained test. Accordingly, actuation of the left sensor 14L will directly result in the generation of a failure signal. Moreover, a holding circuit will be set up continuously energizing the left failure system relay LFSR and timer relay TR after the latter latches. During the initial time period until the timer relay TR latches, a second set of timer inhibitor relay contacts TIR-b are connected in parallel with the timer relay contacts TR-a to establish the holding circuit and enable the failure signal to be generated in the event a failure occurs during such initial time period.

To facilitate low level detection, the signal generated by the press timer 124 also energizes the pilot valve 106 which closes the shut-off valve 104L thus directing substantially all the flow from the tire cavity 100L to the left sensor 14L. Accordingly, low leakage flow rates associated with small leaks will be detected and a corresponding failure signal generated.

Having described the circuit for the left mold cavity 100L, it will be seen that the same equally applies to the circuit for the right mold cavity 100R. Of course, separate circuits will separate components such as the timer relay TR and timer inhibitor relay TIR and their respective contacts can be provided for each press cavity; however, it will be appreciated that only a single timer relay TR and timer inhibitor relay TIR and contacts therefore need be provided. In such case, the right mold cavity circuit is substantially identical to the left mold cavity circuit with the corresponding right failure system components designated by like numerals but with the "R" notation being connected respectively in parallel with their respective corresponding components of the left mold cavity circuit. Moreover, additional relays and contacts for additional sensors can be incorporated in similar fashion if desired whereby a plurality of mold cavities or portions thereof can be monitored by a single detector.

The Sensor

Turning now to FIG. 3, the preferred form of sensor 14 is shown which preferably is utilized in the above described detector. When so utilized, a highly reliable detector 12 and detector system of even higher sensitivity, repeatability and durability is obtained.

The sensor 14 comprises a housing 129 having a vertical, longitudinally extending bore 130 in which a hermetically sealed, electrical flapper or reed switch 131 is disposed. Suitable electrical connections 132 electrically connect the same to the logic circuit 112 in the above-described manner.

Extending in parallel relationship to the switch 131 is vertical bore 134 which opens at the bottom of the housing. The opened end thereof is threaded for receipt of the threaded portion of a fitting 136 which is connected to the leakage passages of the curing press. Slidingly movable in the bore 134 is a piston or shuttle 138 in which is embedded and axially oriented a magnet 140. The magnet carrying shuttle 138 is supported on a low flow piston 142 slidingly received in bore 144 in the inlet fitting with a lap fit. The low flow piston 142 comprises a cylindrical skirt portion 146 and a flange portion 148 closing the upper end of the skirt portion. One or more metering orifice holes 150 in the flange portion 148 are provided and two large by-pass holes 152 are provided in the piston skirt 146 such that the latter are exposed only after actuation of the switch 131. An upwardly extending stud 154 is provided on the flange portion against which the magnet carrying piston 138 rests thus to space the same from the flange portion so that the metering orifice holes 150 are not blocked thereby.

In operation, when flow enters through the inlet fitting 136, a pressure differential is created on each side of the metering orifice holes 150 in the flange portion 148 of the low flow piston 144 thus causing the same to move upwardly. Upward movement of the low flow piston lifts the magnet carrying piston 138 and the magnet carried therein upwardly for closing of the switch 131 when a predetermined flow rate exists. When metered by-pass flow is exceeded after actuation, the two large by-pass holes in the piston skirt are exposed to maintain low pressure drop through the sensor. When the flow through the sensor ceases the shuttle will be returned by gravity to its non-flow state and the switch will reopen.

It should be appreciated that the preferred sensor reduces substantially the mechanical friction losses commonly encountered with other types of sensors which are responsive to pressure. Moreover, the sensors when employed in the detector 12 of the invention provide a detector of high sensitivity, repeatability and stability.

Although the sensor 14 preferably is vertically orientated as described with the piston and shuttle being returned by gravity when the flow ceases, the sensor may be otherwise oriented and a spring employed to provide for the biased return of the shuttle and piston. However such will reduce the sensitivity of the sensor, and thus the sensitivity of the detector.

The sensor above described is commercially available except as modified and oriented as described above. Sensors of this type without modifications can be obtained from Delaval Turbine, Inc., Farmington, Conn. under the Model No. FS-926.

The embodiments of the invention in which an exclusive property or privilege is claimed are defined as follows:

1. A bladder leak and rupture detector for a tire curing press having an operating cycle wherein a fluid-inflatable bladder is used in conjunction with a mold cavity to shape and cure a tire positioned between the bladder and mold, said detector comprising:
   leakage passage means communicating with the space between the bladder and mold,
   sensor means responsive to fluid leakage through said leakage passage means, and
   means for generating a failure signal in response to actuation of said sensor means during a preselected portion of the operating cycle and at other times in response to sustained actuation of said sensor means for a predetermined time.

2. A detector as set forth in claim 1 wherein said sensor means is responsive to the rate of flow of fluid through said leakage passage means.

3. A detector as set forth in claim 1 comprising vent means communicating with the space between the bladder and mold, and valve means for said vent means for opening and closing said vent means.

4. A bladder leak and rupture detector for a tire curing press having an operating cycle wherein a fluid-inflatable bladder is used in conjunction with a mold cavity to shape and cure a tire positioned between the bladder and mold, said detector comprising:
   leakage passage means communicating with the space between the bladder and mold, sensor means responsive to fluid leakage through said leakage passage means, and means for generating a failure signal in response to actuation of said sensor means during a preselected portion of the operating cycle and at other times in response to sustained actuation of said sensor means for a predetermined time, said sensor means being responsive to the rate of flow of fluid through said leakage passage means and including a housing having a bore, a shuttle movably disposed in said bore, a magnet carried by said shuttle, switch means responsive to the position of said magnet, and a piston disposed in said bore operable to move said shuttle in one direction, said piston including metering means for fluid whereby when fluid passes through said metering means, said piston moves in said one direction moving said shuttle thereby to actuate said switch means.

5. A detector as set forth in claim 4 wherein said bore is substantially vertically disposed and said shuttle and piston are biased downwardly by gravity.

6. A detector as set forth in claim 5 wherein said switch means comprises a reed switch.

7. A detector as set forth in claim 6 wherein said metering means comprises at least one metering orifice in said piston.

8. A detector as set forth in claim 7 comprising a fitting in the end of said bore, said fitting having a bore, and said piston being movably disposed in said bore.

9. A detector as set forth in claim 8 wherein said piston comprises an elongate cylinder closed at one end, said orifice being in said piston at said one end, and at least one by-pass opening intermediate the length of said piston.

10. A detector as set forth in claim 6 wherein said switch means comprises a reed switch having its longitudinal extent substantially parallel to and adjacent said bore.

11. A bladder leak and rupture detector for a tire curing press having an operating cycle wherein a fluid-inflatable bladder is used in conjunction with a mold cavity to shape and cure a tire positioned between the bladder and mold, said detector comprising:

leakage passage means communicating with the space between the bladder and mold, sensor means responsive to fluid leakage through said leakage passage means, means for generating a failure signal in response to actuation of said sensor means during a preselected portion of the operating cycle and at other times in response to sustained actuation of said sensor means for a predetermined time, vent means communicating with the space between the bladder and mold, and valve means for said vent means for opening and closing said vent means, said valve means closing said vent means during such preselected portion of the operating cycle and opening said vent means at such other times.

12. A detector as set forth in claim 11 for a press having a press timer wherein actuation of said valve means is responsive to a signal from the press timer.

13. A detector for producing an output signal indicative of a bladder leak or rupture in a tire curing press having an operating cycle comprising:

first means for generating a first signal in response to a bladder failure;

second means for generating a second signal in response to continuous generation of said first signal for a predetermined time period; and third means for generating an output signal in response to simultaneous generation of said first and second signals.

14. A detector as set forth in claim 13 wherein said first means comprises sensor means responsive to fluid flow therethrough.

15. A detector as set forth in claim 13 further comprising means operative to prevent loading of a next tire in response to said first signal.

16. A detector as set forth in claim 13 further comprising holding circuit means for maintaining generation of said first and second signals in response to simultaneous generation of the same.

17. A detector for producing an output signal indicative of a bladder leak or rupture in a tire curing press having an operating cycle comprising:

first means for generating a first signal in response to a bladder failure;

second means for generating a second signal in response to continuous generation of said first signal for a predetermined time period;

third means for generating an output signal in response to simultaneous generation of said first and second signals; and means for causing said second means to generate said second signal independently of said first signal during a preselected portion of the operating cycle whereby said output signal is directly responseive to said first signal during such pre-selected portion of the operating cycle.

18. A detector as set forth in claim 17 wherein such pre-selected portion of the operating cycle is during the blow-down portion of the tire press operating cycle.

19. A detector as set forth in claim 18 for a tire curing press having a press timer wherein said means for continuously generating is responsive to a signal from the press timer.

20. A detector for sensing a failure in a system comprising:

sensor means for sensing such failure in the system, relay means operable to latch in response to actuation of said sensor means by such failure, timer relay means operable to latch in response to continuous energization for a predetermined time, first relay contact means operable to energize said timer relay means when said relay means is latched, and second relay contact means and a first timer relay contact means connected in series and operable with their respective relay means are latched to generate a failure signal.

21. A detector as set forth in claim 20 comprising third relay contact means and second timer relay contact means connected in series in line with said relay and timer relay means and operable to maintain said relay and timer relay means energized when said third relay contact means and second timer relay contact means are latched.

22. A detector as set forth in claim 21 comprising timer inhibiter relay means operable to latch in response to a signal independent of such failure in the system, and a first timer inhibiter relay contact means operable when latched to energize said timer relay means.

23. A detector as set forth in claim 22 comprising second timer inhibiter relay contact means connected in parallel with said first mentioned timer relay contact means and in series with said second relay contact means whereby a holding circuit may be established independent of the latching of said timer relay means.

24. A detector as set forth in claim 20 comprising a plurality of each said sensor means, relay means, and first mentioned and second relay contact means, each component, respectively, being connected in parallel with its like corresponding component whereby a plurality of failures in a system may be sensed for.

25. A bladder leak detector for a tire curing press including a tire cavity, passage means interconnecting the cavity and atmosphere, and flow responsive signal means in said passage operative to monitor flow through said passage means, said flow responsive signal means being a vertically oriented magnetic piston operative to close a switch when moved vertically.

26. A bladder leak detector as set forth in claim 25 wherein said piston is returned by gravity upon the absence of flow against said piston.

27. A bladder leak detector for a tire curing press including a tire cavity, passage means interconnecting the cavity and atmosphere, flow responsive signal means in said passage operative to monitor flow through said passage means, and time delay means requiring sustained flow before actuation of said detector.

* * * * *